United States Patent
Jantke et al.

(10) Patent No.: US 10,766,779 B2
(45) Date of Patent: Sep. 8, 2020

(54) ECONOMICALLY VIABLE PROCESS FOR PRODUCING ORGANICALLY MODIFIED LYO- OR AEROGELS

(71) Applicant: Wacker Chemie AG, Munich (DE)

(72) Inventors: Dominik Jantke, Eching (DE); Konrad Hindelang, Munich (DE); Richard Weidner, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 15/513,064

(22) PCT Filed: Jun. 20, 2016

(86) PCT No.: PCT/EP2016/064130
§ 371 (c)(1),
(2) Date: Mar. 21, 2017

(87) PCT Pub. No.: WO2016/207096
PCT Pub. Date: Dec. 29, 2016

(65) Prior Publication Data
US 2018/0105429 A1    Apr. 19, 2018

(30) Foreign Application Priority Data
Jun. 25, 2015 (DE) .................. 10 2015 211 812

(51) Int. Cl.
| | |
|---|---|
| C01B 33/158 | (2006.01) |
| C01B 33/16 | (2006.01) |
| C01B 33/155 | (2006.01) |
| C01B 33/107 | (2006.01) |
| C07F 7/08 | (2006.01) |

(52) U.S. Cl.
CPC .......... *C01B 33/158* (2013.01); *C01B 33/107* (2013.01); *C01B 33/155* (2013.01); *C01B 33/1585* (2013.01); *C01B 33/163* (2013.01); *C01B 33/166* (2013.01); *C07F 7/081* (2013.01)

(58) Field of Classification Search
CPC .............. C01B 33/1546; C01B 33/154; C01B 33/152–166
See application file for complete search history.

(56) References Cited

U.S. PATENT DOCUMENTS

| | | | | |
|---|---|---|---|---|
| 4,089,932 A | * | 5/1978 | Morita ................ | B01J 2/08 423/338 |
| 4,465,849 A | * | 8/1984 | Terae ................... | C08G 77/06 528/12 |
| 5,807,501 A | * | 9/1998 | Burns .................. | C01B 33/16 106/490 |
| 6,475,561 B1 | | 11/2002 | Schwertfeger | |
| 6,481,649 B1 | | 11/2002 | Schmidt | |
| 6,620,355 B1 | | 9/2003 | Schmidt | |
| 2001/0034375 A1 | | 10/2001 | Schwertfeger et al. | |
| 2003/0207950 A1 | | 11/2003 | Schwertfeger et al. | |
| 2006/0112860 A1 | * | 6/2006 | Yoshitake ............. | B82Y 30/00 106/490 |
| 2008/0081014 A1 | | 4/2008 | Ahn et al. | |
| 2009/0247655 A1 | | 10/2009 | Kim et al. | |
| 2012/0225003 A1 | | 9/2012 | Joung et al. | |
| 2016/0258153 A1 | | 9/2016 | Koebel et al. | |
| 2016/0264427 A1 | * | 9/2016 | Oh ......................... | C01B 33/16 |

FOREIGN PATENT DOCUMENTS

| | | | | |
|---|---|---|---|---|
| CN | 103964449 | A | * | 8/2014 |
| CN | 104556063 | A | | 4/2015 |
| DE | 19648798 | A1 | | 6/1998 |
| DE | 69904142 | T2 | | 7/2003 |
| DE | 69819365 | T2 | | 8/2004 |
| EP | 0948395 | B1 | | 1/2006 |
| EP | 2832690 | A1 | | 2/2015 |
| KR | 1020090069187 | A | | 6/2009 |
| WO | 2008143384 | A1 | | 11/2008 |
| WO | WO-2015119430 | A1 | * | 8/2015 ............. C01B 33/16 |

OTHER PUBLICATIONS

Hexamethyldisilazine safety data sheet. Sigma-Aldrich. 2015. (Year: 2015).*
Hexamethyldisiloxane hydrolysis information. ECHA. https://echa.europa.eu/registration-dossier/-/registered-dossier/15156/5/3/3#. As viewed on May 14, 2019. (Year: 2019).*
Definition of immiscible. Hawley's Condensed Chemical Dictionary. Sixteenth Edition. John Wiley & Sons, Inc. 2016. p. 752. (Year: 2016).*
Trimethylsilanol Information. Fisher Scientific. https://www.fishersci.com/shop/products/trimethylsilanol-acros-organics-3/AC458570050. As viewed on Jun. 20, 2019. (Year: 2019).*
Hexamethyldisiloxane Information. Fisher Scientific. https://www.fishersci.com/shop/products/hexamethyldisiloxane-98-acros-organics-4/AC194791000#?keyword=hexamethyldisiloxane. As viewed on Jun. 20, 2019 (Year: 2019).*
Seguin, K. et al. Rationalizing the mechanism of HMDS degradation in air and effective control of the reaction byproducts. Proc. SPIE 6022, Metrology, Inspection, and Process Control for Microlithography XXII, 692230. Mar. 24, 2008. (Year: 2008).*

(Continued)

*Primary Examiner* — Stephen E Rieth
(74) *Attorney, Agent, or Firm* — Caeser Rivise, PC

(57) ABSTRACT

It is an object of the invention to provide a rapid and economically viable process which is notable for efficient use of material, especially of the silylating agent, and by means of which organically modified lyo- or aerogels are obtained in a rapid and simple manner. This object is achieved by virtue of the invention providing a process for producing organically modified gels selected from lyo- and aerosols by (i) emulsifying a basic polar phase comprising water and starting materials for silicatic gels in a nonpolar phase containing a water-immiscible precursor for an active silylating agent, (ii) starting formation of gel and ageing by lowering the pH, and then (iii) starting the silylation and the exchange of solvent by lowering the pH. If the gels are aerogels, the gels provided can be used for thermal and/or acoustic insulation.

9 Claims, No Drawings

(56) References Cited

OTHER PUBLICATIONS

Machine Translation of CN103964449A. Aug. 6, 2014. (Year: 2014).*
Definition of miscible. https://www.merriam-webster.com/dictionary/miscible. As viewed on Jun. 2, 2020. (Year: 2020).*
Aegerter et al. (Eds.), Aerogels Handbook Series: Advances in Sol-Gel Derived Materials and Technologies, 1st Ed. 2011, Springer Verlag, New York, Dordrecht, Heidelberg, London. pp. 607-633.
Schwertfeger et al. Hydrophobic waterglass based aerogels without solvent exchange or supercritical drying. Journal of Non-Crystalline Solids 225 (1998): 24-29.
International Search Report from corresponding PCT/EP2016/064130 dated Aug. 24, 2016.
English Abstract for CN 104556063 A (2015).

\* cited by examiner

ECONOMICALLY VIABLE PROCESS FOR PRODUCING ORGANICALLY MODIFIED LYO- OR AEROGELS

CROSS-REFERENCE TO RELATED APPLICATIONS

This application is a U.S. National Phase Application of PCT/EP2016/064130, filed Jun. 20, 2016, which claims priority from DE 102015211812.6 filed Jun. 25, 2015, the contents of which applications are incorporated herein by reference in their entireties for all purposes.

BACKGROUND OF THE INVENTION

Subject-matter of the invention is a process for producing organically modified gels selected from lyogels or aerogels, by (i) emulsifying a basic, polar phase comprising water and starting materials for silicatic gels in an apolar phase comprising a water-immiscible precursor of an active silylating agent, (ii) commencing gel formation and aging by lowering the pH, and then (iii) lowering the pH to commence silylation and solvent exchange.

Against a background of increasing awareness of sustainable development and of the increasing expense of energy, and also of increasing scarcity of fossil raw materials, a higher position has been acquired by heat insulation for the purpose of energy saving. These requirements with regard to optimizing heat insulation protection are equally valid both for buildings, in other words for new-builds or existing buildings, and for thermal insulation in the logistical or fixed-location sector.

Against the backdrop of a sustainable insulation which features low thermal conduction and low combustibility, the focus is increasingly on inorganic, porous materials.

Aerogels with high porosities (>60%) and low density (<0.6 g/ml) have low thermal conductivity and therefore find a broad spectrum of application as thermal insulators (M. A. Aegerter et al. (Eds.), Aerogels Handbook Series: Advances in Sol-Gel Derived Materials and Technologies, 1st ed. 2011, Springer Verlag, New York Dordrecht Heidelberg London).

Gels, particularly $SiO_2$ gels, are constructed of networks which are composed of primary particles which, after their linkage and sintering of the contact faces, in a sol-gel process, form stable, liquid-filled networks, known as lyogels. Whereas in the case of a lyogel the pores are filled with solvent, a hydrogel represents a special case of the lyogel, in which at least 50% of the pore liquid consists of water. These lyogels can be converted, by removal of the solvent, into aerogels. The pores of the aerogel, accordingly, are filled with air.

It is desirable to maximize the hydrophobicity of the $SiO_2$ aerogels in order to reduce the water absorption and therefore the loss of the thermal insulating effect. Permanent hydrophobicity is achieved by treating the surface of gel networks with hydrophobic groups, preferably by modification.

This hydrophobization not only fulfills the purpose of reduced water absorption in the dry state, but also allows subcritical drying of the gels. In subcritical drying, the capillary forces which act result in contraction of the gels, this contraction being irreversible in the case of hydrophilic surfaces with free Si—OH groups through the condensation of these Si—OH groups in the contracted state. Hydrophilic lyogels, moreover, are generally filled with polar solvents, which are responsible, by means of high capillary forces, for severe contraction of the gels. In the case of the hydrophobized surfaces, the lyogels are generally present in apolar solvents. As a result of the drying, reduced contraction is observed, on the one hand, and the possibility for condensation of the Si—OH groups is prevented as well, these groups having been functionalized by the hydrophobization.

For economically viable implementation of a process for producing organically modified aerogels which can be dried subcritically it is particularly desirable to develop extremely rapid and cost-effective operating steps which are distinguished by efficient use of materials and, in particular, by short times and ease of implementation for the individual process steps.

In EP 0 948 395 B1, accordingly, a process for producing organically modified aerogels was developed by directly surface-modifying a hydrogel without first replacing the aqueous pore liquid by organic solvents. The examples use a sodium silicate solution or silicon tetrachloride as $SiO_2$ source and employ hexamethyldisiloxane (HMDSO), trimethylchlorosilane (TMCS) or trimethylsilanol for modification. The free, hydrophilic Si—OH groups of the hydrogel react with the silylating agents used, and functionalization takes place with oxygen-bonded trimethylsilyl groups (TMS, $(CH_3)_3SiO_{1/2}$). If the silylation is conducted with reaction of some of the water in the pores of the hydrogel with the silylating agent used (e.g., TMCS) to give the water-insoluble hexamethyldisiloxane, then the volume of the compound formed necessarily displaces at least some of the water from the pores. This leads, during the silylation of the internal surface of the network, to a simultaneous, complete or partial exchange of the liquid in the pores of the hydrogel for the water-insoluble, apolar medium.

A disadvantage of the process disclosed in EP 0 948 395 B1 is that either the hydrogels must be prepared from alkali metal silicate by prior desalting with ion exchangers, or the removal of the salts after silylation is difficult to accomplish. Upstream production of sol by neutralization of the alkali metal silicate solution constitutes an additional operating step which, because of the necessary cooling, for example, is energy-intensive and is costly and inconvenient as a process. Moreover, the process has the disadvantage that either the silylation takes place at temperatures of 80-100° C. or a very long reaction time of several days is required. Only through the use of large quantities of HCl and/or trimethylchlorosilane is success achieved here in a rapid and complete silylation. During the hydrophobization, the pore liquid is displaced from the gel and replaced by HMDSO; the authors of this patent, F. Schwertfeger and D. Frank, in a subsequent publication with M. Schmidt in Journal of non-Crystalline Solids (vol. 225, pp. 24-29, 1998), specify that for complete replacement of the pore liquid, they require at least 15 mol % of TMCS based on the pore water, corresponding to 81.5 g of TMCS per 100 g of hydrogel (see sample 2 in tab. 1), in order to obtain complete replacement of the pore liquid and hence to obtain aerogels of low density (less than 140 kg/m³). This results in 80 ml of HMDSO byproduct per 100 g of hydrogel. Raw materials costs here are high.

US 2012/0225003 describes a process for producing aerogel powders by mixing alkali metal silicate with an inorganic acid, preferably nitric acid, and an organosilane, preferably hexamethyldisilazane (HMN), and carrying out emulsification in an organic solvent, the selection here being specified from n-hexane, n-heptane, toluene, xylene or mixtures thereof. Both gel formation and solvent exchange take place simultaneously. A feature of the process is that it is very quick to implement, since the formation of sol, in other words the neutralization of the alkali metal silicate solution, takes place directly in the continuous phase. Gel formation and water displacement can be concluded here in about an hour. The removal of the electrolytes—that is, of the salts formed from the precursors, the silylating agent and the mineral acid—is accomplished in the course of the water displacement.

A disadvantage of this process is that the water-miscible silylating agent used, hexamethyldisilazane, is added in large quantities (60 ml per 500 ml of alkali metal silicate solution) and is consumed fully by the reactions which take place. Even the fraction which does not react with the surface in the course of the silylation is consumed by hydrolysis and condensation processes and cannot be directly recovered. The associated high costs for the raw materials, and the complexity of physical separation and/or disposal, result in high production costs.

The object was therefore to provide a rapid and economically viable process which is notable for efficient use of materials, particularly of the silylating agent, and which produces organically modified aerogels rapidly and easily.

DESCRIPTION OF THE INVENTION

This object is achieved by the invention, which provides a rapid process allowing organically modified gels to be obtained. The invention provides a process for producing organically modified gels selected from lyogels or aerogels, by (i) emulsifying a basic, polar phase comprising water and starting materials for silicatic gels in an apolar phase comprising a water-immiscible precursor of an active silylating agent, (ii) commencing gel formation and aging by lowering the pH, and then (iii) lowering the pH to commence silylation and solvent exchange.

A gel in the sense of the present invention is a disperse system consisting of at least two components. The solid component forms a spongelike, three-dimensional network, whose pores are filled with a liquid or a gas. The liquid or gaseous component is thereby immobilized in the solid component. If the pores are filled with solvent, the gel is a lyogel. If the network is of high porosity and air is the gas enclosed, the gel is also termed an aerogel. In accordance with the invention, the gels are selected from lyogels or aerogels.

In accordance with the invention, in the $1^{st}$ step of the process (step i), a basic, polar phase, comprising water and starting materials for silicatic gels, is emulsified in an apolar phase comprising a water-immiscible precursor of an active silylating agent.

By emulsifying is meant that an emulsion, i.e., a finely divided mixture of two normally immiscible liquids, is produced without visible separation. To prevent separation it is possible, for example, to continue stirring or to carry out stabilization by means of surfactants, for example.

In this invention, the basic, polar phase is also termed aqueous phase. The apolar phase is also termed continuous phase.

In the context of this invention, the terms silylation, surface modification, and hydrophobization have the same meaning.

In accordance with the invention, the gels are silicatic gels, meaning that the network contains $[SiO_{4/2}]$ units.

As starting material for $[SiO_{4/2}]$ units ($[SiO_{4/2}]$ starting material) it is possible to use the condensable tetra-functional or more highly polyfunctional silanes, alkoxysilanes, alkyl silicates, alkali metal silicates or colloidal silica particles and/or silica solutions that are known to the skilled person.

As starting material for $[SiO_{4/2}]$ units, preference is given to using alkali metal silicates or colloidal silica solutions, where the average particle diameter of the silica particles is preferably below 8 nm, more preferably below 6 nm, especially preferably in the range from 1 to 5 nm. Especially preferred is the use of sodium silicate. The pH of the solution of the starting materials is preferably above pH 10, more preferably above pH 11.

Especially preferred is the use of colloidal silica solutions. Mixtures or hydrolysis products of the stated starting materials, more particularly of their hydrolysis products with water and/or alcohols, can also be used.

The silicatic gels of the invention, selected from lyogels or aerogels, comprise $[SiO_{4/2}]$ units. It is preferred for the gels to contain not only the $[SiO_{4/2}]$ units but also $[R_xSiO_{(4-x)/2}]$ units; with particular preference, the gels are composed of $[SiO_{4/2}]$ and $[R_xSiO_{(4-x)/2}]$ units. This means that the basic polar phase preferably comprises a mixture of the starting materials for $[SiO_{4/2}]$ and $[R_xSiO_{(4-x)/2}]$ units where x=1 or 2 or mixtures thereof and R may be identical or different and is hydrogen or an organic, substituted or unsubstituted radical.

As starting material for $[R_xSiO_{(4-x)/2}]$ units ($[R_xSiO_{(4-x)/2}]$ starting material) it is possible to use condensable difunctional, trifunctional or more highly polyfunctional silanes, alkoxysilanes or siliconates that are known to the skilled person.

Preferred starting material used for the $[R_xSiO_{(4-x)/2}]$ units is methyltriethoxysilane (MTES), methyltrimethoxysilane, potassium methylsiliconate or sodium methylsiliconate; especially preferred for use are potassium methylsiliconate or sodium methylsiliconate.

It is also possible for mixtures or hydrolysis products of the stated starting materials, especially their hydrolysis products with water and/or alcohols, to be used.

The radicals R may be identical or different and, independently of one another, hydrogen, an organic, linear, branched, cyclic, saturated or unsaturated, aromatic or heteroaromatic radical, with or without substituents. This means that the radicals R may be substituted or unsubstituted. Preferred substituents are —CN, —NCO, —NR$_2$, —COOH, —COOR, -halogen, -(meth)acryloyl, -epoxy, —SH, —OH, —CONR$_2$, —O—R, —CO—R, —COO—R, —OCO—R, or —OCOO—R, —S—R, —NR—, —N=R, —N=N—R, or —P=R. Preference is given to using saturated or unsaturated radicals with $C_1$-$C_4$, more preferably $C_1$-$C_4$ alkyl, vinyl, especially methyl or ethyl, particularly methyl.

At least one radical R in the $[R_xSiO_{(4-x)/2}]$ units is preferably organic in nature, meaning that there is at least one Si—C bond present; more preferably at least one radical R is a methyl group, and especially preferably all radicals R in the $[R_xSiO_{(4-x)/2}]$ units are methyl groups.

The fraction of the $[R_xSiO_{(4-x)/2}]$ units (based on the sum total of the $[SiO_{4/2}]$ units and the $[R_xSiO_{(4-x)/2}]$ units) may be in the range between 0 and 99 mol %, and is preferably between 0 and 50 mol %, more preferably between 0 and 25 mol %, and especially preferably between 0 and 10 mol %.

An advantage of using starting materials for $[R_xSiO_{(4-x)/2}]$ units in step i) of the process is that the product (that is, the gel) receives a basic hydrophobization through the Si—R groups of the $[R_xSiO_{(4-x)/2}]$ units. The silylation which follows in step iii) performs modification of free and accessible Si—OH groups that are still present. The basic hydrophobization and silylation are therefore cooperative (common) effects. Given that the basic hydrophobization also modifies—i.e., bonds to a group R—Si positions which might possibly not be accessible to the subsequent silylation if they had a free OH group, it is possible to achieve high overall hydrophobicity on the part of the gel through the use of starting materials for [$R_xSiO_{(4-x)/2}$] units.

Hydrophobicity is understood for the purposes of the invention to refer to the property whereby the surface of the products is modified with apolar, organic units, leading to the surface of the products being largely unwettable by water.

The aforementioned starting materials for [$SiO_{4/2}$] units and optionally [$R_xSiO_{(4-x)/2}$] units can be diluted to the desired concentration by addition of water and optional addition of a phase mediator, and also, optionally, of a gel formation accelerator, and emulsified in a water-immiscible precursor of a silylating agent. Emulsifying takes place according to the methods known to the skilled person, such as stirring, for example. In order to prevent separation occurring, stirring is continued.

In one preferred embodiment, the basic, polar phase is produced by mixing the individual components in the apolar phase. This means that the water-immiscible precursor of the silylating agent is introduced initially and the further ingredients, comprising the starting materials for silicatic gels and, optionally, auxiliaries, are added successively. The basic, polar phase comprising the starting materials for silicatic gels is therefore, in one preferred embodiment, produced directly in the water-immiscible precursor of a silylating agent, with an emulsion being formed. The stirring speed here is preferably selected such that no phase separation comes about owing to the different densities of the aqueous, disperse phase and the continuous phase.

In the polar phase there are, optionally, also auxiliaries such as phase mediators. They are either formed from the starting materials or are added. The addition may be made during the emulsifying of the starting materials, during or after gel formation, or before the start of the silylation. The process of the invention takes place preferably in the presence of a phase mediator, which with particular preference is present in the basic, polar phase. It is especially preferred for the phase mediator to be added immediately before the start of the silylation, i.e., directly before step iii).

An auxiliary is understood in the present specification to refer to a substance which makes it possible to shorten the reaction times needed for the production of organically modified gels and/or to lower the operating temperatures required. All auxiliaries known to the skilled person for shortening the gel formation time are used, an example of a preferred auxiliary being sodium chloride.

A phase mediator is understood in the present specification to refer to a polar compound, or to mixtures of various such compounds, which possesses significant solubility both in the water-rich phase and in the organic phase and therefore accelerates transport of material between the two substantially immiscible phases.

Suitable phase mediators are polar organic compounds or mixtures thereof such as alcohols, especially of the chemical formula R—OH, where R is defined as stated above for radicals R (e.g., methanol, ethanol, isopropanol)

ketones, especially of the chemical formula $R^1R^2C{=}O$, where $R^1$ and $R^2$ are identical or different and are defined as started above for radicals R (e.g., acetone $(CH_3)_2C{=}O$)

ethers, especially of the chemical formula $R^1OR^2$, where $R^1$ and $R^2$ are identical or different and are defined as stated above for radicals R (e.g., diethyl ether, tetrahydrofuran, dimethoxyethane)

esters, especially of the chemical formula $R^1COOR^2$, where $R^1$ and $R^2$ are identical or different and are defined as stated above for radicals R (e.g., ethyl acetate), and interface-active substances such as surfactants. Organic compounds referred to as interface-active are compounds which by virtue of their structure arrange themselves in the interface between two phases in such a way that they lower the interfacial tension (=surface tension) and thereby enable wetting, for example. By lowering the surface tension, they promote the mixing of two phases, in certain circumstances to the point where an emulsion is formed. Depending on their chemical composition and use, interface-active substances are referred to as wetting agents, detergents (surfactants, soap) or emulsifiers.

The substances generally contain both a strongly water-attracting, hydrophilic ("water-friendly") group and a lipophilic ("fat-friendly") hydrocarbon group with only weak attraction for water molecules (hydrophobic).

Phase mediators used are preferably alcohols such as, for example, methanol, ethanol, and isopropanol, with ethanol being an especially preferred phase mediator used. It is especially preferred, therefore, for ethanol to be present in the basic, polar phase.

Auxiliaries are added to the aqueous phase as well, optionally, to accelerate gel formation. Preference is given to adding an alkali metal salt to the aqueous phase. With particular preference, sodium chloride is added to the aqueous phase.

Additions to the aqueous phase may further include adjuvants such as—as the skilled person is aware—IR opacifiers for reducing the thermal conductivity. Also possible is the addition of coated and/or uncoated fibers for increasing the mechanical stability. Fiber materials used may include inorganic fibers, such as glass fibers or mineral fibers, organic fibers, such as polyester fibers, aramid fibers, nylon fibers or fibers of plant origin, for example, and also mixtures thereof.

In the present process, in accordance with the invention, the aqueous, disperse phase comprising starting materials for [$SiO_{4/2}$] units and optionally [$R_xSiO_{(4-x)/2}$] units has a basic pH, i.e., a pH of greater than 7. The pH of the aqueous phase is preferably between 10 and 14. The presence of a basic pH in the aqueous phase/step i) has the advantage that as yet there is no gel formation and also no activation of the precursor of the active silylating agent.

The solids content of the gels, meaning the amount of [$SiO_{4/2}$] units and optionally [$R_xSiO_{(4-x)/2}$] units, in the aqueous phase is preferably between 3 and 30 wt %, more preferably between 3 and 20 wt %, and especially preferably between 3 and 10 wt %.

The prior removal of electrolytes, such as salts, for example, is unnecessary in this process. The electrolytes present in the polar phase are displaced from the pores in the course of the solvent exchange and can be removed with the polar phase by a phase separation.

As continuous phase it is possible to use all water-immiscible precursors known to the skilled person for active silylating agents.

For the inventive implementation of the process here it is preferred for the precursors of active silylating agents to be largely inactive at basic to neutral pH levels at which steps i) and ii) of the invention are carried out; in other words, it is preferred that silylation of the internal surface of the gels formed cannot take place within the time needed for gel formation without a further activation step. The water-immiscible precursors of active silylating agents may optionally also be present in a mixture with water-insoluble, organic solvents, such as, for example, n-hexane, n-heptane. With preference the continuous, apolar phase consists only of a water-immiscible precursor of an active silylating agent. Particularly preferred for use as precursors of active silylating agents are compounds which, through the silylation, result in the population of the inner and outer gel surfaces with monofunctional units. Especially preferred for use as water-immiscible precursors of an active silylating agent are disiloxanes or mixtures thereof, and also solutions thereof in nonreactive, polar solvents. The solvents are preferably hydrocarbons such as pentane, hexane, heptane, and toluene.

Disiloxanes are chemical compounds having the formula $R_3Si-O-SiR_3$ or $[R^1R^2R^3SiO_{1/2}]_2$, where the definition given above applies to R or $R^1$, $R^2$, and $R^3$, and the disiloxane has at least one Si—C bond. Preference is given to using symmetrical disiloxanes, especially preferably hexamethyldisiloxane. Mixtures of different disiloxanes can also be used, more particularly mixtures of hexamethyldisiloxane and divinyltetramethyldisiloxane.

This procedure has the advantage that after the end of the silylation, the fraction of the continuous phase that is not required for the reaction can be recovered, thus contributing to an economically viable implementation. There is no decomposition of the unrequired precursor of the active silylating agent.

A precursor of an active silylating agent is understood in the present specification to be an agent which through activation is suitable for the transfer of silyl groups.

In accordance with the invention in the $2^{nd}$ step of the process (step ii) gel formation and aging are commenced by lowering of the pH.

For the gel formation a pH preferably of ≥7, more preferably between 7 and 10, and especially preferably between 8 and 9 is set. The pH is lowered in step ii) preferably by adding acids; all acids known to the skilled person may be used. Employed with particular preference for lowering the pH in step ii) is a mineral acid, especial preference being given to using $HNO_3$ (nitric acid) or HCl (hydrochloric acid). The term "mineral acids" is a collective designation for the four strong inorganic acids hydrochloric acid, sulfuric acid, phosphoric acid, and nitric acid. Additionally a change in temperature, preferably an increase in temperature, may be carried out in order to accelerate gel formation.

In another preferred embodiment, the pH can be lowered in step ii) by adding chlorosilanes. Chlorosilanes are compounds of type $R_xSiCl_{4-x}$ where x=0-2 and R is subject to the definition above. These chlorosilanes are hydrolyzed in the aqueous phase to form HCl and $[R_xSiO_{(4-x/2)}]$ units. An advantage of this procedure is that the addition of further precursors of silicatic aerogels such as the precursors of $[R_xSiO_{(4-x/2)}]$ units for example, is coupled directly with the generation of the acid by hydrolysis of the chlorosilanes, in one operating step.

An advantage of the process of the invention is that gel formation is carried out by addition of the acid to the pre-prepared emulsion of the basic, polar phase, comprising water and starting materials for silicatic gels, in the apolar phase, comprising a water-immiscible precursor of an activated silylating agent. In accordance with the invention, therefore, there is no initial introduction and subsequent silylation of a hydrogel; instead, gel formation takes place in the presence of the precursor of an active silylating agent. The operating step of external sol formation is therefore removed.

Moreover, separately prepared sols, after the pH suitable for gel formation has been set, either have to be kept stable by intense cooling, or the emulsification has to take place very quickly in order to prevent premature gel formation. The process of the invention, accordingly, is less energy-intensive, more cost-effective, and easier to implement in process terms.

The gel formation in accordance with the invention is carried out at a temperature as low as possible, for reasons of economic viability. If it is necessary to achieve short gel formation times, the gel formation time in emulsion can be accelerated by an increase in temperature or by addition of a gel formation accelerator. Alkali metal salts are used with preference for that purpose. In general the gel formation is carried out at a temperature between 0° C. and the boiling point of the solvents present, preferably between 20 and 80° C., more preferably between 40 and 60° C. The gel formation time, this being the period until a gel has formed after the pH has been lowered, is preferably less than 60 minutes, more preferably less than 15 minutes, and very preferably less than 5 minutes.

In accordance with the invention, gel formation is followed by aging. Aging for the purposes of the invention means that the dispersed hydrogel particles are incubated at a temperature in the range from 20 to 100° C., preferably at 40 to 60° C., at a pH of 7 to 10, preferably 8 to 9, for a defined time period (aging time). Aging is carried out preferably under the same conditions (pH and temperature) as gel formation. The aging time is between 15 minutes and 3 hours, preferably between 15 minutes and 2 hours.

The gel particles obtained are subsequently surface-modified by silylation. In accordance with the invention, silylation and solvent exchange in the $3^{rd}$ step of the process (step iii) are commenced by lowering of the pH. To start the reaction, a mineral acid, preferably hydrochloric acid, is added as initiator to activate the precursor of the silylating agent. Here there is a lowering of the pH into the strongly acidic range. The silylation is carried out preferably at a pH of less than 3, more preferably less than 2, and especially preferably less than 1.5. The pH in step iii) is lowered preferably using a mineral acid, particular preference being given to the use of $HNO_3$ (nitric acid) or HCl (hydrochloric acid). The time for the silylating operation is preferably less than 12 hours, more preferably between 15 minutes and 3 hours, especially preferably between 15 minutes and 2 hours, and with especial preference between 15 and 60 minutes. The reaction is carried out preferably between 40 and 90° C., more preferably between 40 and 80° C. It is especially preferred for the silylation to be carried out at the temperature at which the preceding steps have been carried out.

To simplify the operation and to reduce the wastes to be reprocessed, preference is given to using the same mineral acid in step ii) and step iii). With particular preference hydrochloric acid is used in step ii) and step iii).

During the silylation, phase mediators may be present in the reaction mixture. These phase mediators may either be formed from the starting materials for the gels, or may be added to the reaction mixture. The phase mediators may be added either to the aqueous phase itself, before, during or after gel formation, during or after aging, in other words immediately prior to the start of silylation. The phase mediators are subject to the definition given above.

A solvent exchange means that during the silylation, the polar, water-containing and electrolyte-containing pore liquid is displaced from the gel and replaced by the organic phase, preferably disiloxane, especially preferably by hexamethyldisiloxane. Since the aqueous pore liquid is substantially immiscible with the organic phase, a second, aqueous, liquid phase is formed during the silylation. Given that the aqueous phase possesses a higher density than the organic phase, and the gel particles are preferably in the organic phase, the process of the invention permits simple and resource-sparing separation of substances. By determining the amount of displaced pore liquid, moreover, the reaction course can be monitored.

It is advantageous and therefore preferred for the aqueous, electrolyte-containing phase to be removed from the organic phase containing the lyogel by means of a phase separation ahead of further processing of the gel. The gel, or the organic phase containing the lyogel, can be subsequently extracted and/or washed with solvents. There is particular advantage in washing the reaction mixture with water in order to remove remaining electrolytes in the form of salts and excess acids. This simple regime for removing the electrolytes is particularly important for industrial implementation in particular, in contrast to the removal of a large proportion of the electrolytes before the operation, by ion exchange, for example.

It is advantageous and therefore preferred for the gel particles to be isolated from the excess apolar phase after the aqueous phase has been removed. The separation may be carried out by all methods known to the skilled person for solid/liquid and/or liquid/liquid separation (e.g., decanters, settling tanks, centrifuges, distillation, . . . ).

The gel produced by the process of the invention is preferably dried. Drying may take place, in general, either in the supercritical range or in the subcritical range. Drying takes place preferably below the critical point of the solvent, preferably at temperatures of −30 to 200° C., more preferably 0 to 150° C., and also under pressures preferably of 0.001 to 20 bar, more preferably 0.01 to 5 bar, more particularly 0.01 to 2 bar. This drying may take place by radiation drying, convection drying and/or contact drying. Drying is preferably continued until the gel has a residual solvent content of less than 0.1 wt %.

Before, during or after drying, preferably during or after drying, it is possible optionally for the gels to be agglomerated to form larger particles. This can be done, for example, by known processes (see, for example, U.S. Pat. Nos. 6,481,649 B1 and 6,620,355 B1). The dried gels preferably are agglomerated.

The present invention therefore provides a rapid, inexpensive, resource-sparing process, and one which is also easy and safe to carry out, for the production of organically modified gels selected from lyogels and aerogels. A particular feature of the process of the invention is the combination of the advantages of rapid reaction course, use of relatively small amounts of acids as initiator in conjunction with relatively mild temperature conditions during gel formation and silylation. The particularly preferred embodiment of the direct emulsification of the precursors of silicatic gels in the water-immiscible precursor of an active silylating agent, with subsequent gel production and surface modification, where the water displacement and removal of electrolytes is carried out in one step, provides a process which allows the realization of a continuous industrial operation by virtue of particularly efficient recycling of material, rapid transport of material, and rapid reaction steps. The individual advantages have already been discussed in detail above.

The aerogels which can be produced by the process of the invention are used preferably for insulation applications, more preferably in thermal or acoustic insulation. With particular preference the aerogels of the invention or aerogels producible in accordance with the invention are used as heat insulation material.

Analytical Methods

Determination of Bulk Density

The bulk density was determined in accordance with DIN 53468 by pouring the aerogel powder, without further compaction, into a cylindrical vessel of known volume (50 cm$^3$) and then weighing the aerogel powder to determine its weight.

Determination of BET Surface Area

The specific surface area of the aerogels was determined by the BET method in accordance with DIN 9277/66131 and 9277/66132.

Determination of BJH Pore Volume and Average Pore Diameter

Pore analysis was carried out by the method of Barrett, Joyner and Halenda (BJH, 1951) in accordance with DIN 66134. The data of the desorption isotherm were used for evaluation.

Determination of Yield

Yield was determined by drying the gel particles to constant weight and then weighing them at room temperature.

Determination of Thermal Conductivity

The thermal conductivity was determined at room temperature using a Linseis THB Transient Hot Bridge Analyzer (THB-100) together with a THB Hot Point Sensor (3×3 mm Kapton) (measuring time 30 seconds, current strength: 5 mA, heating power: 5 mW). For measurement, the sensor was introduced into the uncompacted bed of product, the measurement therefore taking place at the specified bulk density.

Estimation of pH

The pH was estimated using Fisherbrand universal indicator paper (pH range 1-14).

Determination of Carbon Content

The carbon content (C content) of the samples was determined on a Leco CS 230 Analyzer. Analysis took place by high-frequency combustion of the sample in a stream of oxygen. Non-dispersive infrared detectors were used for detection.

Determination of Amount of Alkali Metals (Sodium and Potassium)

The amount of alkali metal ions is determined by ICP emission spectroscopy on a Perkin Elmer Optima 7300 DV. The basis for the measurement is the light emitted and resolved spectrally by the alkali metal atoms when they are sprayed into an argon plasma at a temperature of 6000-8000 K, generated within a radiofrequency coil.

Determination of Thermal Conductivity

The thermal conductivity was determined in the powder bed with a Linseis THB-100.

WORKING EXAMPLES

The invention is described in more detail below using working examples without being restricted as a result.

Provenances

Alkali metal silicate (examples 1-5: Sigma-Aldrich: $SiO_2$ content: 26.5 wt %, $Na_2O$ content: 10.6 wt %; example 7: Wöllner: sodium silicate 38/40, solids content: 36 wt %, $SiO_2/Na_2O$=3.3)

Potassium methylsiliconate (SILRES® BS 16 from Wacker Chemie AG: aqueous solution with 34 wt % active substance fraction and 20 wt % $K_2O$)

$SiO_2$ nanosol (Bindzil 17/750 from Akzo Nobel: $SiO_2$ content: 15 wt %, average particle diameter according to manufacturer: 4 nm, pH 10.5)

Hexamethyldisiloxane (AK 0.65 from Wacker Chemie AG)

Unless mentioned specifically, all other laboratory chemicals were obtained from Sigma-Aldrich.

Example 1

In a glass vessel, 10 g of alkali metal silicate and 5 g of potassium methylsiliconate were mixed and diluted with 40 g of water and 8 g of ethanol. 50 g of the resulting solution were emulsified in 200 ml of hexamethyldisiloxane by stirring with a KPG stirrer at 400 rpm in a 500 ml round-bottom flask, and the emulsion obtained was heated to 40° C. 20 ml of $HNO_3$ solution (10 wt %) were added to this emulsion in order to commence gel formation. In this operation, the pH fell to about 9. After stirring for 1.5 hours at 40° C., 20 ml of HCl solution (32 wt %) were added to start the silylation and the solvent exchange, with a pH of 1 becoming established. After 45 minutes, displacement of water was complete. The aqueous phase (86 ml) was separated off and the organic phase containing the lyogel was reagitated twice more with 50 ml of water each time at room temperature (400 rpm), and the aqueous phase was again separated off. The resulting organic phase was filtered and the lyogel obtained was dried to constant weight in a drying cabinet at 120° C.

Analytical Data
 Bulk density: 0.095 g/cm$^3$
 BET: 630 m$^2$/g
 BJH pore volume: 3.9 cm$^3$/g
 Average pore diameter: 20 nm
 Yield: 3.6 g
 C content: 13.7%
 Na content: <0.1%
 K content: <0.1%
 Thermal conductivity (bed): 17.5 mW/K*m

Example 2

In a glass vessel, 10 g of alkali metal silicate and 5 g of potassium methylsiliconate were mixed and diluted with 40 g of water and 8 g of ethanol. 50 g of the resulting solution were emulsified in 200 ml of hexamethyldisiloxane by stirring with a KPG stirrer at 400 rpm in a 500 ml round-bottom flask, and the emulsion obtained was heated to 40° C. 20 ml of HCl solution (6 wt %) were added to this emulsion in order to commence gel formation. In this operation, the pH fell to about 9. After stirring for 1.5 hours at 40° C., 20 ml of HCl solution (32 wt %) were added to start the silylation and the solvent exchange, with a pH of 1 becoming established. After 30 minutes, displacement of water was complete. The aqueous phase (85 ml) was separated off and the organic phase containing the lyogel was reagitated twice more with 50 ml of water each time at room temperature intensely for 5 minutes (400 rpm), and the aqueous phase was again separated off. The resulting organic phase was filtered and the lyogel obtained was dried to constant weight in a drying cabinet at 120° C.

Analytical Data
 Bulk density: 0.12 g/cm$^3$
 BET: 640 m$^2$/g
 BJH pore volume: 3.2 cm$^3$/g
 Average pore diameter: 14 nm
 Yield: 3.7 g
 C content: 13.5%
 Na content: <0.1%
 K content: <0.1%
 Thermal conductivity (bed): 18.5 mW/K*m

Example 3

In a glass vessel, 11.25 g of alkali metal silicate and 3.75 g of potassium methylsiliconate were mixed and diluted with 40 ml of water and 10 ml of ethanol. 50 ml of the resulting solution were emulsified in 100 ml of hexamethyldisiloxane by stirring with a KPG stirrer at 400 rpm in a 500 ml round-bottom flask. The resulting emulsion was heated to 40° C. 20 ml of HCl solution (6 wt %) were added to this emulsion in order to commence gel formation. In this operation, the pH fell to about 10. After stirring for 1.5 hours at 40° C., 20 ml of HCl solution (32 wt %) were added to start the silylation and the solvent exchange, with a pH of 1 becoming established. After 45 minutes, displacement of water was complete. The aqueous phase (81 ml) was separated off and the organic phase containing the lyogel was reagitated twice more with 50 ml of water each time at room temperature (400 rpm), and the aqueous phase was again separated off. The resulting organic phase was filtered and the lyogel obtained was dried to constant weight in a drying cabinet at 120° C.

Analytical Data
 Bulk density: 0.11 g/cm$^3$
 BET: 630 m$^2$/g
 BJH pore volume: 3.0 cm$^3$/g
 Average pore diameter: 14 nm
 Yield: 3.5 g
 C content: 12.2%
 Na content: 0.14%
 K content: 0.10%
 Thermal conductivity: 19.1 mW/K*m

Example 4

In a glass vessel, 11.25 g of alkali metal silicate and 3.75 g of potassium methylsiliconate were mixed and diluted with 40 ml of water and 10 ml of ethanol. 50 ml of the resulting solution were emulsified in 100 ml of hexamethyldisiloxane by stirring with a KPG stirrer at 400 rpm in a 500 ml round-bottom flask. The resulting emulsion was heated to 40° C. 20 ml of HCl solution (6 wt %) were added to this emulsion in order to commence gel formation. In this operation, the pH fell to about 10. After stirring for 30 minutes at 40° C., 20 ml of HCl solution (32 wt %) were added to start the silylation and the solvent exchange, with a pH of 1 becoming established. After 45 minutes, displacement of water was complete. The aqueous phase (83 ml) was separated off and the organic phase containing the lyogel was reagitated twice more with 50 ml of water each time at room temperature (400 rpm), and the aqueous phase was again separated off. The resulting organic phase was filtered and the lyogel obtained was dried to constant weight in a drying cabinet at 120° C.

Analytical Data
 Bulk density: 0.11 g/cm$^3$
 BET: 690 m$^2$/g
 BJH pore volume: 3.1 cm$^3$/g
 Average pore diameter: 15 nm
 Yield: 3.5 g C content: 13.1%
Na content: 0.35%
K content: 0.27%
Thermal conductivity: 20.9 mW/K*m Example 5

In a glass vessel, 15 g of alkali metal silicate were diluted with 50 ml of water. 50 ml of the resulting solution were emulsified in 100 ml of hexamethyldisiloxane by stirring with a KPG stirrer at 400 rpm in a 500 ml round-bottom flask. The resulting emulsion was heated to 40° C. 20 ml of HCl solution (6 wt %) were added to this emulsion in order to commence gel formation. In this operation, the pH fell to about 8. After stirring for 1.5 hours at 40° C., 20 ml of ethanol and 20 ml of HCl solution (32 wt %) were added to start the silylation and the solvent exchange, with a pH of 1 becoming established. After 75 minutes, displacement of water was complete. The aqueous phase (100 ml) was separated off and the organic phase containing the lyogel was reagitated twice more with 50 ml of water each time at room temperature (400 rpm), and the aqueous phase was again separated off. The resulting organic phase was filtered and the lyogel obtained was dried to constant weight in a drying cabinet at 120° C.
Analytical Data
Bulk density: 0.06 g/cm$^3$
BET: 580 m2/g
BJH pore volume: 4.9 cm$^3$/g
Average pore diameter: 24 nm
Yield: 3.1 g
C content: 6.9%
Na content: 0.32%
Thermal conductivity: 18.5 mW/K*m Example 6

In a glass vessel, 15 g of Bindzil 15/750 and 3.1 g of SILRES® BS16 were diluted with 35 g of water. The resulting solution was emulsified in 100 ml of hexamethyldisiloxane by stirring with a KPG stirrer at 400 rpm in a 500 ml round-bottom flask. The resulting emulsion was heated to 40° C. 5.7 g of HCl solution (10 wt %) were added to this emulsion in order to commence gel formation. In this operation, the pH fell to about 8. After stirring for 1.5 hours at 40° C., 20 ml of ethanol and 20 ml of HCl solution (32 wt %) were added to start the silylation and the solvent exchange and the mixture was heated to 80° C., with a pH of 1 becoming established. After 45 minutes, displacement of water was complete. The aqueous phase (81 ml) was separated off and the organic phase containing the lyogel was reagitated twice more with 50 ml of water each time at room temperature (400 rpm), and the aqueous phase was again separated off. The resulting organic phase was filtered and the lyogel obtained was dried to constant weight in a drying cabinet at 120° C.
Analytical Data
Bulk density: 0.12 g/cm$^3$
BET: 470 m$^2$/g
BJH pore volume: 2.9 cm$^3$/g
Average pore diameter: 18 nm
Yield: 2.7 g
C content: 8.5%
Na content: <0.1%
Thermal conductivity: 18.7 mW/K*m Example 7

In a glass flask (500 ml) equipped with a KPG stirrer (400 rpm), 200 ml of hexamethyldisiloxane were introduced and 84.36 g of water and 21.74 g of alkali metal silicate (Wollner) were added successively. The emulsion obtained was heated to 40° C. This was followed by addition of 2.5 g of methyltrichlorosilane in order to commence gel formation. In this operation, the pH fell to about 8. After stirring for 1.5 hours at 40° C., 20 ml of ethanol and 20 ml of HCl solution (32 wt %) were added to start the silylation and the solvent exchange with a pH of 1 becoming established, and the mixture was heated to 80° C. After 30 minutes, displacement of water was complete. The aqueous phase (115 ml) was separated off and the organic phase containing the lyogel was reagitated twice more with 50 ml of water each time at room temperature (400 rpm), and the aqueous phase was again separated off. The resulting organic phase was filtered and the lyogel obtained was dried to constant weight in a drying cabinet at 120° C.
Analytical Data
Bulk density: 0.13 g/cm$^3$
BET: 680 m$^2$/g
BJH pore volume: 2.9 cm$^3$/g
Average pore diameter: 11 nm
Yield: 6.4 g
C content: 10.0%
Na content: 0.68%
Thermal conductivity: 19.3 mW/K*m

The invention claimed is:

1. A process for producing lyogels or aerogels, said process comprising the following steps
  i) emulsifying a basic, polar phase comprising water and starting materials for silicatic gels in an apolar phase consisting of a water-immiscible precursor of an active silylating agent,
  ii) commencing gel formation and aging by lowering a pH, and then
  iii) lowering the pH to commence silylation and solvent exchange.

2. A process for producing lyogels or aerogels, said process comprising the following steps
  i) emulsifying a basic, polar phase comprising water and starting materials for silicatic gels in an apolar phase comprising a water-immiscible precursor of an active silylating agent,
  ii) commencing gel formation and aging by lowering a pH with a chlorosilane, and then
  iii) lowering the pH to commence silylation and solvent exchange.

3. A process for producing lyogels or aerogels, said process comprising the following steps
  i) emulsifying a basic, polar phase comprising water and starting materials for silicatic gels in an apolar phase consisting of a water-immiscible precursor of an active silylating agent,
  ii) commencing gel formation and aging by lowering a pH, and then
  iii) lowering the pH to commence silylation and solvent exchange, and
  iv) recovering the water-immiscible precursor of the active silylating agent which remains unreacted in the apolar phase,
  wherein (a) disiloxanes or mixtures thereof are used as the water-immiscible precursor of an active silylating agent, (b) the basic, polar phase is produced by mixing individual components in the apolar phase, and (c) there is a phase mediator in the basic, polar phase.

4. The process as claimed in claim 3, wherein the basic, polar phase comprises a mixture of the starting materials for $[SiO_{4/2}]$ and $[R_xSiO_{(4-x/2)}]$ units where x=1 or 2 or mixtures thereof and R is identical or different and is hydrogen or an organic, substituted or unsubstituted radical.

5. The process as claimed in claim 3, wherein hexamethyldisiloxane is used as the water-immiscible precursor of an active silylating agent.

6. The process as claimed in claim 3, wherein a mineral acid is used in step ii) for lowering the pH.

7. The process as claimed in claim 6, wherein the mineral acid used for lowering the pH in step ii) is also used in step iii) to lower the pH.

8. The process as claimed in claim 3, further comprising drying to provide aerogels.

9. The process as claimed in claim 3, wherein a chlorosilane is used in step ii) for lowering the pH.

* * * * *